United States Patent
Kim et al.

(10) Patent No.: US 11,541,860 B2
(45) Date of Patent: Jan. 3, 2023

(54) SYSTEM AND METHOD FOR SENSING BRAKE JUDDER IN VEHICLE

(71) Applicants: Hyundai Motor Company, Seoul (KR); Kia Motors Corporation, Seoul (KR)

(72) Inventors: Sun Joo Kim, Suwon-si (KR); Gwang Yun Kim, Ansan-si (KR); Hyun Dong Her, Seoul (KR); Jae Kwang Seol, Hwaseong-si (KR); Jae Min Yun, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 294 days.

(21) Appl. No.: 16/915,505

(22) Filed: Jun. 29, 2020

(65) Prior Publication Data
US 2021/0213927 A1 Jul. 15, 2021

(30) Foreign Application Priority Data
Jan. 15, 2020 (KR) .......................... 10-2020-0005081

(51) Int. Cl.
*B60T 17/22* (2006.01)
*B60T 7/06* (2006.01)
*B60T 7/04* (2006.01)

(52) U.S. Cl.
CPC ............. *B60T 17/22* (2013.01); *B60T 7/042* (2013.01); *B60T 7/06* (2013.01); *B60T 2210/14* (2013.01);

(Continued)

(58) Field of Classification Search
CPC .. B60T 2250/04; B60T 17/22; B60T 2220/04; B60T 2210/14; B60T 8/173;
(Continued)

(56) References Cited

U.S. PATENT DOCUMENTS 8,544,966 B2 * 10/2013 Nakajima ............. B60T 8/4059
303/155
2010/0268420 A1 * 10/2010 Yasui .................. B60T 8/17555
701/41

(Continued)

FOREIGN PATENT DOCUMENTS

GB       2531777 A   *  5/2016  ................ B60T 1/10
JP    2000-283193 A     10/2000
(Continued)

OTHER PUBLICATIONS

Savitski, et al.; Advanced control functions of decoupled electro-hydraulic brake system; 2016 IEEE 14th International Workshop on Advanced Motion Control (AMC) (https://ieeexplore.ieee.org/document/7496368) (Year: 2016).*

*Primary Examiner* — Atul Trivedi
(74) *Attorney, Agent, or Firm* — Morgan, Lewis & Bockius LLP

(57) ABSTRACT

A system and method for detecting brake judder in a vehicle may include storing information related to determining whether judder was generated when a vehicle was braked, and facilitating easy recognition of a vehicle in which judder was generated, on the basis of stored information without performing methods such as a separate driving reproduction test and a disc thickness measurement test when maintaining later.

18 Claims, 6 Drawing Sheets

(52) U.S. Cl.
CPC ....... *B60T 2220/04* (2013.01); *B60T 2250/04* (2013.01); *B60T 2270/406* (2013.01)

(58) Field of Classification Search
CPC ...... B60T 7/042; B60T 7/06; B60T 2270/406; F16D 66/00; F16D 65/0006
USPC ........................................................... 701/70
See application file for complete search history.

(56) References Cited

U.S. PATENT DOCUMENTS

| | | | |
|---|---|---|---|
| 2018/0015827 A1* | 1/2018 | Takano | B60T 7/14 |
| 2018/0370519 A1* | 12/2018 | Yen | B60W 50/04 |
| 2019/0111790 A1* | 4/2019 | Crombez | B60T 8/268 |

FOREIGN PATENT DOCUMENTS

| | | | | |
|---|---|---|---|---|
| JP | 2018-105345 A | | 7/2018 | |
| KR | 10-0471817 B | | 2/2005 | |
| KR | 20090019248 A | * | 2/2009 | .............. B60T 7/042 |
| WO | WO-2004085220 A1 | * | 10/2004 | ........... B60R 21/013 |
| WO | WO-2019017202 A1 | * | 1/2019 | ........... B60T 13/146 |
| WO | WO-2020006641 A1 | * | 1/2020 | ................ B60T 7/22 |

\* cited by examiner

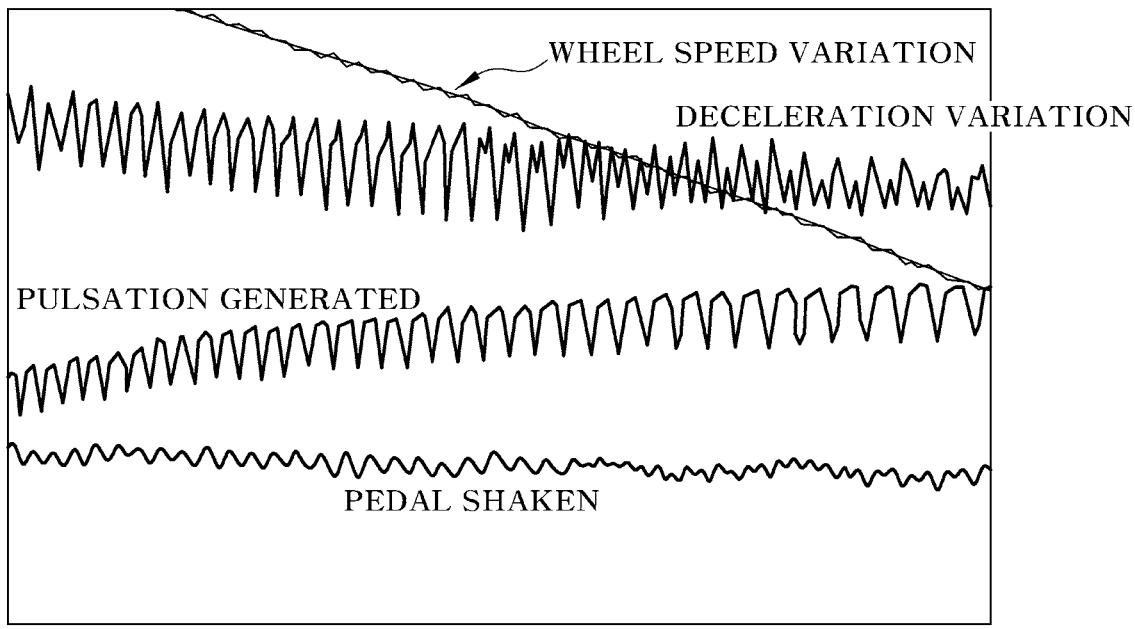
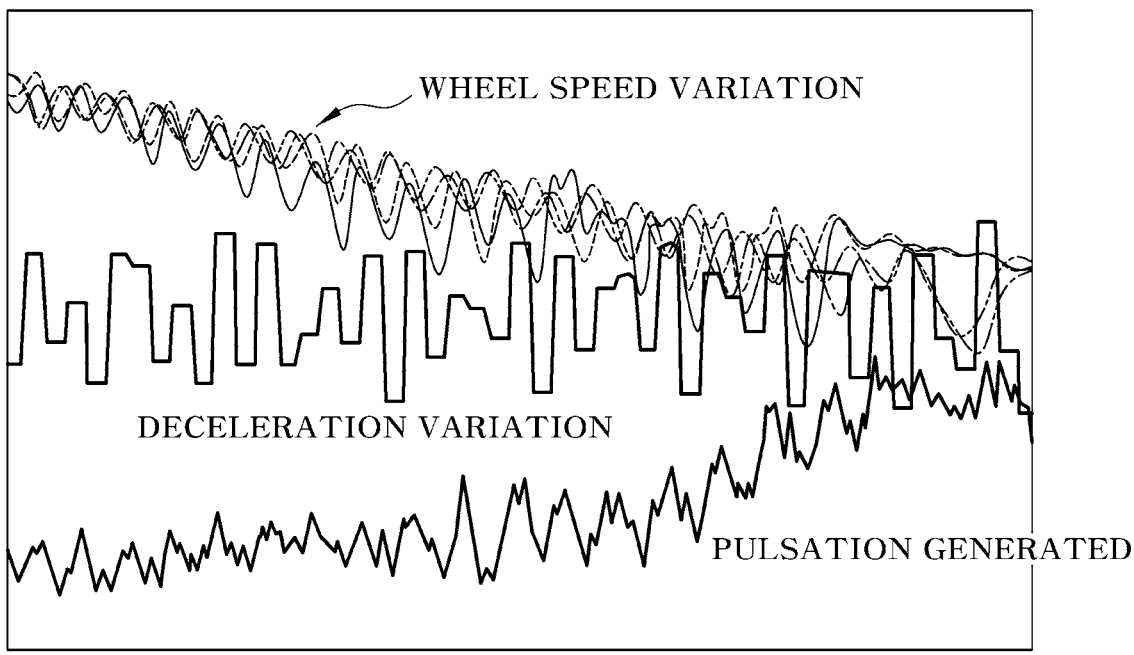
FIG. 3B

SYSTEM AND METHOD FOR SENSING BRAKE JUDDER IN VEHICLE

CROSS REFERENCE TO RELATED APPLICATION

The present application claims priority to Korean Patent Application No. 10-2020-0005081, filed Jan. 15, 2020, the entire contents of which is incorporated herein for all purposes by this reference.

BACKGROUND OF THE INVENTION

Field of the Invention

The present invention relates to a system and method for brake judder in a vehicle, and more particularly, to a system and method for detecting brake judder in a vehicle, the system and method storing information related to determining whether judder was generated when a vehicle was braked, and when maintaining the vehicle on the basis of the stored information, facilitating easy recognition of a vehicle in which judder was generated.

Description of Related Art

In general, brake judder which is generated when a vehicle is braked is a phenomenon such as vibration of the vehicle body or forward/backward vibration of a brake pedal which is caused when the brake pedal is depressed.

Such brake judder is usually generated by thermal deformation and a thickness variation of a brake disc.

In detail, when a brake disc thermally deforms or has a thickness difference, the rotational friction between the brake disc and a friction member changes in braking, so a brake torque variation is generated, which results in shaking of a brake pedal, shaking of a steering wheel, shaking of a vehicle body, etc.

Accordingly, it is important to accurately determine whether brake judder was actually generated when a vehicle which is the target of maintenance was braked, in a process of maintenance for removing brake judder.

As a method of determining brake judder, there is a method of reproducing whether judder is actually generated by repeating braking in a high-speed driving condition, but the present method has a defect that it takes excessive time and A/S cost to check judder.

As another method of determining brake judder, there is a method of directly measuring a thickness difference of a brake disc in the unit of micrometers, but the present method also has a defect that there is a demand for expensive measuring equipment and measurement takes excessive time.

Accordingly, when a vehicle is sent to a vehicle repair shop to remove brake judder, the mechanic replaces a brake disc without the checking procedure using the methods described above, which results in unnecessary and incorrect maintenance and an excessive maintenance cost.

Therefore, there is a demand for a plan for accurately determining whether brake judder is generated.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for detecting brake judder in a vehicle, the system and method storing information in a storage device about determining whether judder was generated when a vehicle was braked, and facilitating easy recognition of a vehicle in which judder was generated without performing methods such as a separate driving reproduction test and a disc thickness measurement test later when maintaining by checking information stored in the storage device through a diagnosis device.

Various aspects of the present invention are directed to providing a system for detecting brake judder in a vehicle, the system including: a hydraulic sensor configured for detecting hydraulic pressure which is distributed from a master cylinder to wheel cylinders of the vehicle; a steering wheel torque sensor configured for detecting steering torque of a steering wheel of the vehicle; an acceleration sensor configured for detecting transverse deceleration and longitudinal deceleration of the vehicle; a controller determining whether judder was generated, on the basis of a detecting signal from the steering wheel torque sensor and a detecting signal from the acceleration sensor, including a detecting signal from the hydraulic sensor when the vehicle is braked; and a storage device configured of storing information related to a result of determining whether judder was generated by the controller.

Various aspects of the present invention are directed to providing a method of detecting brake judder in a vehicle, the method including: verifying whether the vehicle is braked and an anti-lock braking system (ABS) operates by a controller; determining whether judder was generated, on the basis of a detecting signal from a steering wheel torque sensor and a detecting signal from an acceleration sensor, including a detecting signal from a hydraulic sensor that detects hydraulic pressure of a master cylinder by the controller when the vehicle is braked and the ABS does not operate; and storing information related to a result of determining whether judder was generated in a storage device by the controller.

Various aspects of the present invention provide the following effects from the objects described above.

First, it is possible to easily recognizing a maintenance target vehicle in which judder has been generated, by detecting and storing whether judder that a driver can feel when a vehicle is braked in real time in a storage device, and then by checking stored information by connecting a diagnosis device to the storage device when maintaining the vehicle later.

Second, it is possible to accurately determine whether a maintenance target vehicle is a vehicle in which judder was generated, by making it possible to recognize vibration due to an uneven road surface similar to vibration due to judder generated when a vehicle is braked, and to store in a storage device only whether judder was generated.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A is a waveform diagram showing signal values of sensors when brake judder is generated during braking;

FIG. 3B is a waveform diagram comparing signal values of sensors during braking on an uneven road surface;

Figure 1:
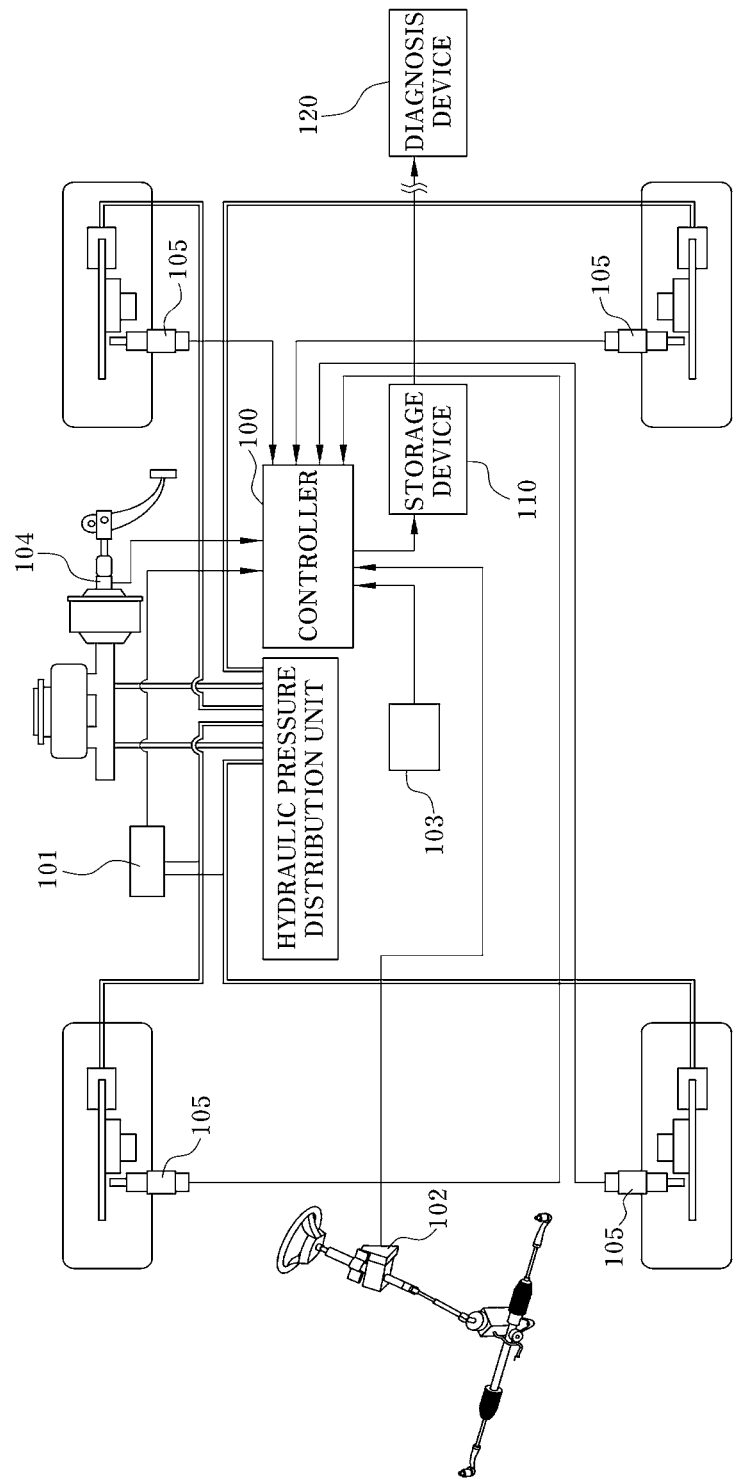
FIG. 1 is a diagram showing the configuration of a system for detecting brake judder in a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

Brake judder, which makes a driver directly feel shaking of a brake pedal, shaking of a steering wheel, shaking of a vehicle body, etc. may be generated when a vehicle is braked and the driver may send the vehicle to a vehicle repair shop to fix the vehicle due to the judder.

The present invention addresses easily showing whether there is judder in a maintenance target vehicle through a simple process of checking information which is stored in a storage device of the vehicle about whether judder was generated, by connecting a diagnosis device provided at a vehicle repair shop to the storage device when the vehicle is sent to the vehicle repair shop, as described above.

FIG. 1 shows a system for detecting brake judder in a vehicle according to an exemplary embodiment of the present invention, in which reference numeral '100' indicates a controller that performs a judder determination logic.

The controller 100 may be an Electronic Stability Control (ESC) system in the vehicle or may be a controller separately purchased and mounted on the vehicle.

Sensors that detect shaking of a brake pedal, shaking of a steering wheel, shaking of a vehicle body, etc. are connected to the controller 100 such that they can transmit signals to the controller.

The sensor for detecting shaking of a brake pedal may be a hydraulic sensor 101 that detects the magnitude of hydraulic pressure, which is transmitted from a master cylinder to wheel cylinders in braking, and transmits a detecting signal to the controller 100.

The sensor for detecting shaking of a steering wheel may be steering wheel torque sensor 102 that detects a steering torque variation of the steering wheel and transmits a detecting signal to the controller 100.

The sensor for detecting shaking of a vehicle body may by an acceleration sensor 103 that detects a transverse acceleration value and a longitudinal acceleration value of the vehicle and transmits a detecting signal to the controller 100.

Accordingly, as if a driver directly feels shaking of a brake pedal, shaking of a steering wheel, shaking of a vehicle body, etc. during braking the vehicle due to judder, when a detecting signal of the steering wheel torque sensor 102 and a detecting signal of the acceleration sensor 103, including a detecting signal of the hydraulic sensor 101, are transmitted to the controller 100 to determine whether judder was generated, the controller 100 determines whether judder was generated, on the basis of the detecting signals from the sensors.

Figure 2:
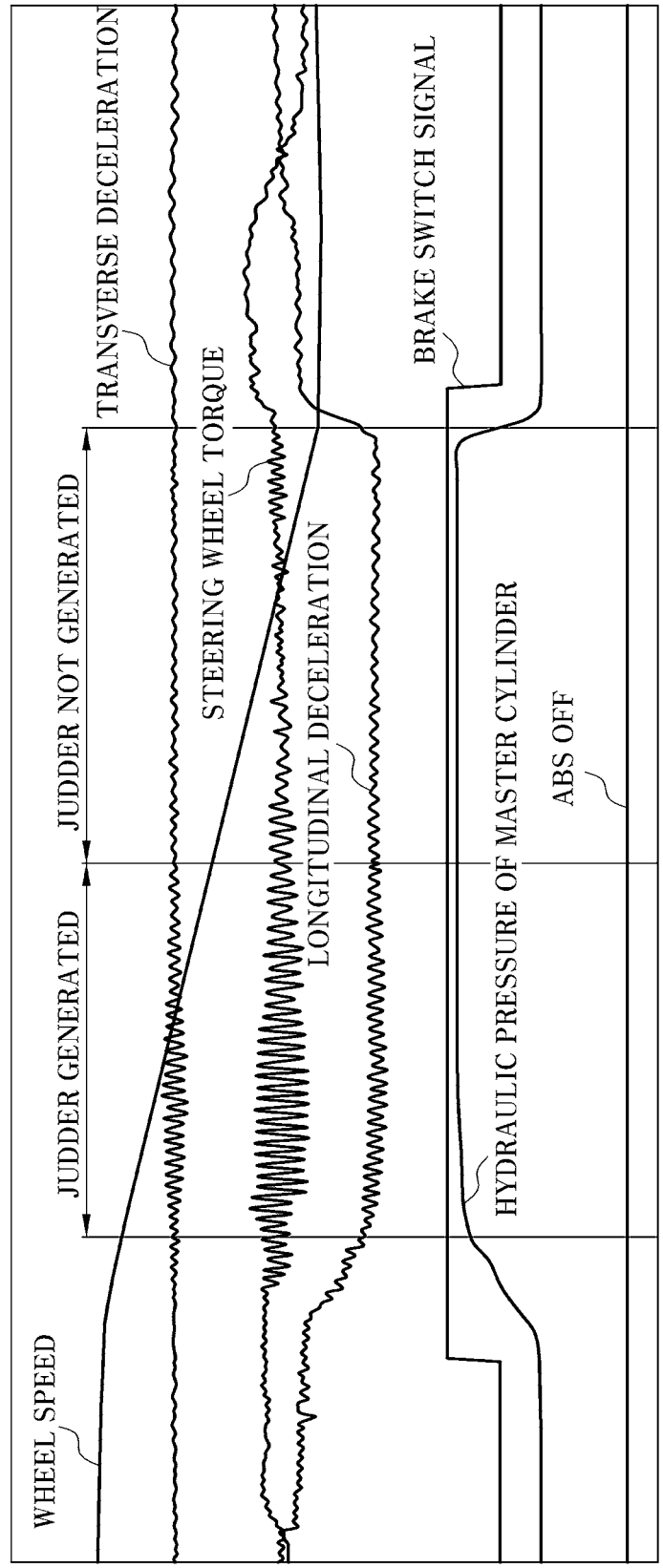
FIG. 2 is a waveform diagram showing detecting waveforms of sensors for detecting brake judder in a vehicle according to an exemplary embodiment of the present invention.

Referring to FIG. 2, it may be seen that there are large changes in hydraulic pressure of a master cylinder which is distributed to wheel cylinders from the master cylinder, steering wheel torque, transverse deceleration, longitudinal deceleration, etc. when judder is generated during braking, as compared with when judder is not generated, so it is possible to determine whether judder was generated, using the detecting signal of the steering wheel torque sensor 102 and the detecting signal of the acceleration sensor 103, including the detecting signal of the hydraulic sensor 101.

Since judder is a phenomenon which is generated when a vehicle is braked, the logic of the controller 100 for determining whether judder was generated may be executed only in braking.

To this end, an on-signal (a signal which is output when a brake pedal is depressed) and an off-signal (a signal which is output when the brake pedal is not depressed) of a brake pedal operation detecting switch 104 are transmitted to the controller 100.

Furthermore, the logic of the controller 100 for determining whether judder was generated may be executed when an Anti-lock Braking System (ABS) is not operated and the reason is that since shaking is unavoidably generated when the ABS is operated, it is possible to increase the accuracy of determining judder by not executing the logic for determining whether judder was generated.

To this end, an on-signal and an off-signal are transmitted to the controller 100 from an ABS controller when the ABS is operated and not operated, respectively.

On the other hand, when a vehicle is braked, vibration due to an uneven road surface, which is similar to judder, may be generated, but this is not the vibration due to judder, so it may be preferable to recognize vibration due to an uneven road surface and except the vibration from the objects for determining judder in the logic of the controller 100 for determining whether judder was generated.

To this end, as a sensor for recognizing vibration due to a road surface similar to the vibration due to judder when a vehicle is braked, a wheel speed sensor 105 that measures wheel speed of wheels is connected to the controller 100 such that it can transmit signals.

As described above, the controller 100 determines whether judder was generated, on the basis of the detecting signal from the hydraulic sensor 101, the detecting signal from the steering wheel torque sensor 102, the detecting signal from the acceleration sensor 103, the detecting signal from the wheel speed sensor 105, the on/off signals of the brake pedal operation detecting switch 104, and the on/off signals of the ABS, and stores information related to the determination result in the storage device 110 thereof.

For example, the storage device 110 may be a data cartridge (DTC) or an electrically erasable programmable read-only memory (EEPROM).

When the vehicle is sent to a vehicle repair shop later for maintenance due to judder, a repairman can easily check whether judder was generated in the maintenance target vehicle only through a simple process of connecting a diagnosis device 102 provided at the vehicle repair shop to the storage device 110 and then checking the information related to whether judder was generated which is stored in the storage device 110.

A method of detecting brake judder according to an exemplary embodiment of the present invention which is implemented on the basis of the configuration described above is described hereafter.

Figure 4:
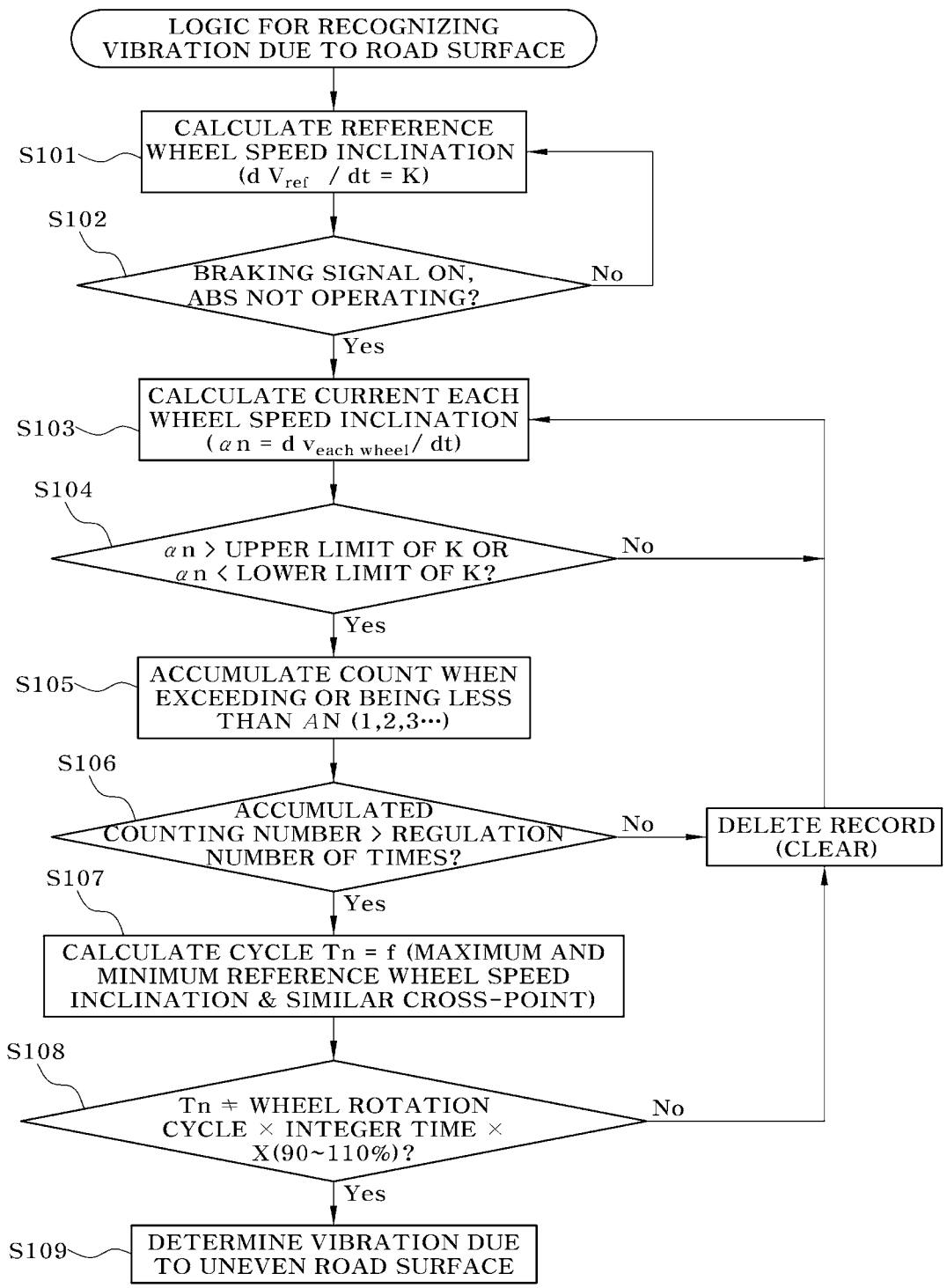
FIG. 4 and FIG. 5 are flowcharts showing a method of detecting brake judder in a vehicle according to an exemplary embodiment of the present invention.

First, a process of determining whether vibration due to a road surface similar to the vibration due to judder was generated when a vehicle was braked is described with reference to the flowchart shown in FIG. 4.

It may be seen that the deceleration variation waveform and the pulsation variation waveform due to judder in braking on a common road surface shown in FIG. 3A are similar to the deceleration variation waveform and the pulsation variation waveform in braking on an uneven road surface shown in FIG. 3B, but the wheel speed variation in braking on an uneven road surface shown in FIG. 3B is severer than the wheel speed variation when judder occurs in braking on a common road surface shown in FIG. 3A.

Accordingly, as data for recognizing vibration due to an uneven road surface similar to the vibration due to judder when a vehicle is braked, a detecting signal of the wheel speed sensor 105 that measures wheel speed of wheels is used in the controller 100.

First, the controller 100 determines a reference wheel speed ($dV_{ref}$) and a reference wheel speed inclination ($dV_{ref}/dt=K$) using a vehicle speed, a tire radius, etc. Without a wheel slip (S101).

Alternatively, the reference wheel speed ($dV_{ref}$) and the reference wheel speed inclination ($dV_{ref}/dt=K$) may be stored in advance in a memory of the controller 100 through a driving test.

Next, the controller 100 checks whether braking occurs and an ABS operates (S102).

That is, the controller 100 checks an on-signal of the brake pedal operation detecting switch 104 and an off-signal of the ABS not operating.

As a result of checking, when the controller 100 receives an on-signal of the brake pedal operation detecting switch 104 and an off-signal of the ABS not operating, the controller 100 determines the current wheel speed inclination ($dV_{each\ wheel}/dt=\alpha n$) of each wheel at a predetermined calculation cycle (about 10-100 ms) (S103).

Figure 6:
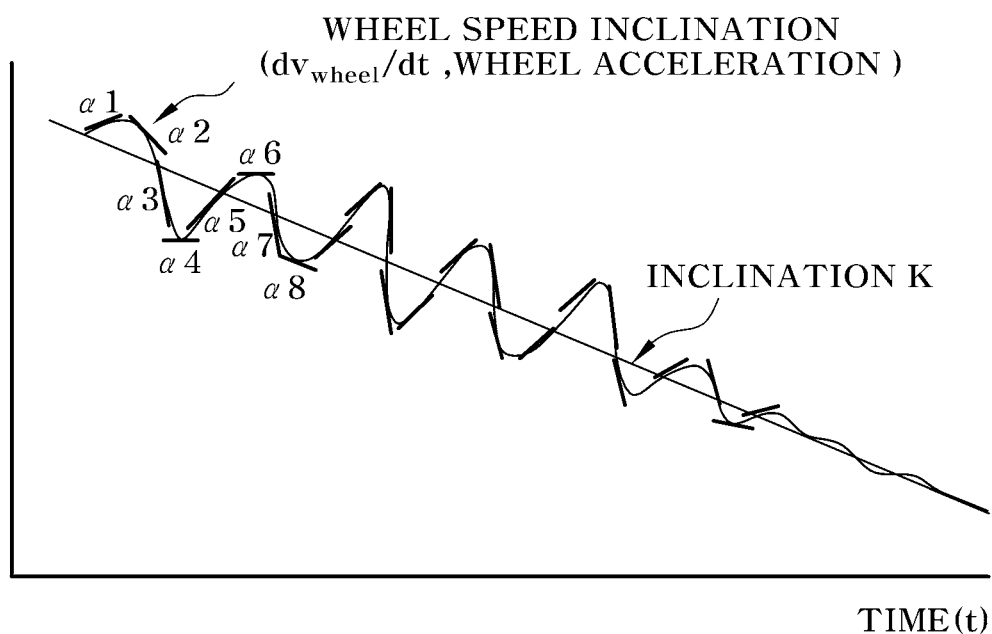
FIG. 6 is a graph showing an example of determining a change in wheel speed inclination which is used in the method of detecting brake judder in a vehicle according to an exemplary embodiment of the present invention.

In the instant case, as shown in FIG. 6, the current wheel speed inclination ($dV_{each\ wheel}/dt=\alpha n$) changes into $\alpha 1$, $\alpha 2$, . . . unlike the reference wheel speed inclination K.

Next, the current wheel speed inclination an is compared with the upper limit and the lower limit of the reference wheel speed inclination K.

That is, it is determined whether the current wheel speed inclination an exceeds the upper limit or is less than the lower limit of the reference wheel speed inclination K.

As the result of comparing, when the current wheel speed inclination an exceeds the upper limit or is less than the lower limit, the controller 100 stores the current wheel speed inclination an exceeding the upper limit of the reference wheel speed inclination K and the current wheel speed inclination an being less than the lower limit of the reference wheel speed inclination K in the storage device 110 (S105).

Furthermore, the controller 100 counts the number of times when the current wheel speed inclination an exceeds the upper limit of the reference wheel speed inclination K and the number of times when the current wheel speed inclination an is less than the lower limit of the reference wheel speed inclination K and stores the numbers of times in the storage device 110 (S105).

Next, the controller 100 compares the accumulated counting number stored in the storage device 110 (the sum of the number of times when the current wheel speed inclination an exceeds the upper limit of the reference wheel speed inclination K and the number of times when the current wheel speed inclination an is less than the lower limit of the reference wheel speed inclination K) with a regulation number of times (S106).

As a result of comparing, when the accumulated counting number is less than the regulation number of time, record deletion that deletes information such as the current wheel speed inclination an and the accumulated counting number stored in the storage device 110 is performed.

However, when the accumulated counting number exceeds the regulation number of times, the controller 100 calculates the cycle of the current wheel speed inclination an (S107).

That is, the controller 100 calculates the cycle Tn of the current wheel speed inclination an that exceeds the upper limit of the reference wheel speed inclination K or is less than the lower limit of the reference wheel speed inclination K.

Figure 7:
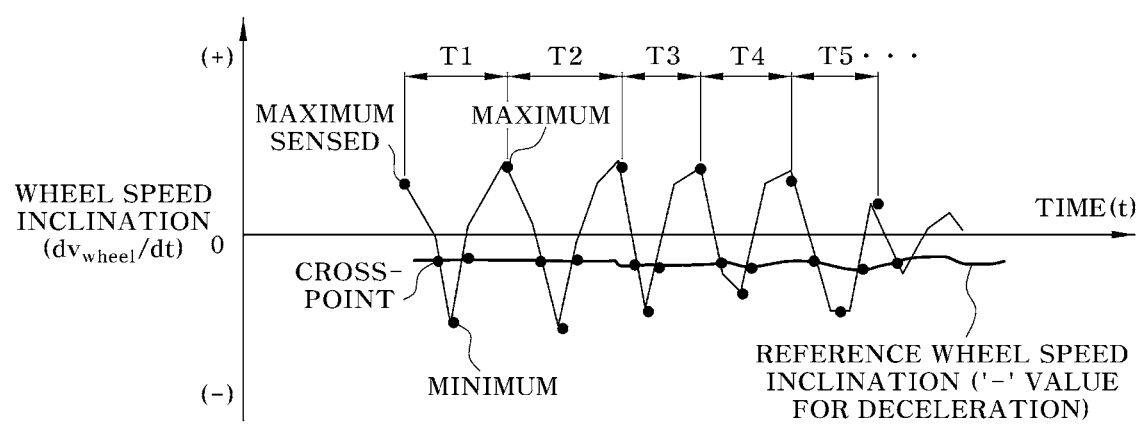
FIG. 7 is a graph showing an example of wheel speed inclination and cycle that are used in the method of detecting brake judder in a vehicle according to an exemplary embodiment of the present invention.

Referring to FIG. 7, the cycle Tn of the current wheel speed inclination an may be calculated using the maximum values and the minimum values of current wheel speed inclinations an that exceeds the upper limit of the reference wheel speed inclination K or is less than the lower limit of the reference wheel speed inclination K, and a cross-point similar to the reference wheel speed inclination K.

Next, the controller 100 determines whether the cycle Tn of the current wheel speed inclination an calculated in S107 is included in a distribution range (e.g., 90-110%) of a wheel rotation cycle at each vehicle speed by comparing the cycle Tn of the current wheel speed inclination an with the wheel rotation cycle at each vehicle speed (S108).

That is, the controller is configured to determine whether the cycle Tn of the current wheel speed inclination an calculated in S107 pertains the product of the wheel rotation cycle at each vehicle speed and the distribution range (e.g., 90-110%) of a wheel rotation cycle at each vehicle speed.

As the result of comparing the cycle Tn of the current wheel speed inclination an calculated in S107 with the wheel rotation cycle at each vehicle speed, when the cycle is not included in the distribution range (e.g., 90-110%) of a wheel rotation cycle at each vehicle speed, the controller 100 determines that vibration due to an uneven road surface was generated in braking by determining the cycle Tn of the current wheel speed inclination an calculated in S107 is the cycle of a wheel speed inclination in braking on an uneven road surface rather than the cycle of a wheel speed inclination on a common road surface (S109).

As described above, it is possible to easily recognize vibration generated due to an uneven road surface which is not vibration due to judder when a vehicle is braked, and when the controller 100 determines that vibration was generated due to an uneven road surface, judder detecting counting is not performed, as described below.

Figure 5:
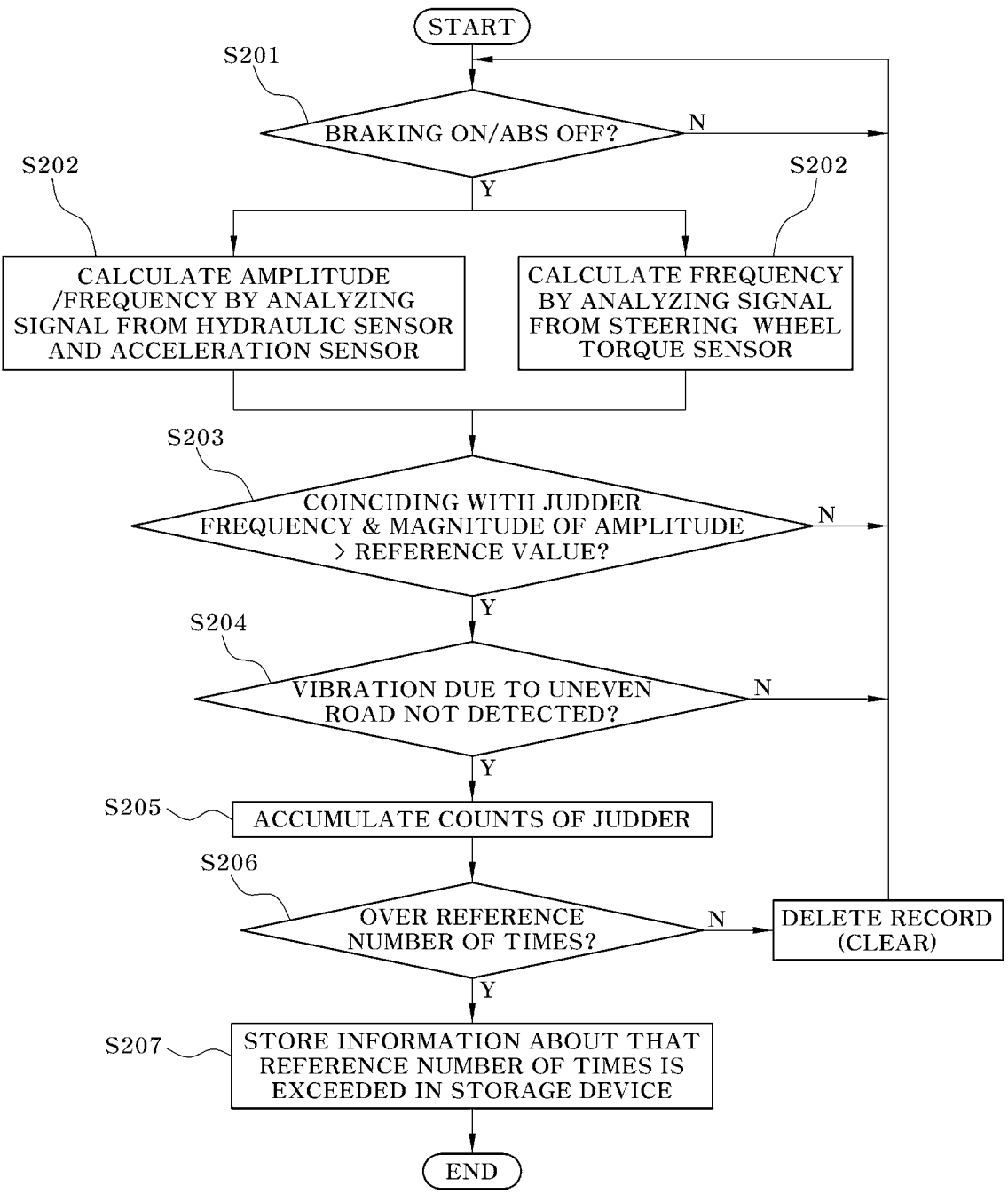

An actual method of detecting brake judder of the present invention is described hereafter with reference to FIG. 5.

First, the controller 100 checks whether braking occurs and an ABS operates (S201).

That is, the controller 100 checks an on-signal of the brake pedal operation detecting switch 104 and an off-signal of the ABS not operating.

As the result of checking, when receiving an on-signal of the brake pedal operation detecting switch 104 and an off-signal of the ABS not operating, the controller actually performs the brake judder detecting logic.

To this end, the controller 100 determines the amplitude and frequency of each signal by receiving and analyzing the detecting signals from the sensors that detect shaking of a brake pedal, shaking of a steering wheel, shaking of a vehicle body, etc (S202).

In other words, the controller 100 determines the amplitudes and frequencies of the detecting signal from the hydraulic sensor 101 employed to detect shaking of a brake pedal (a signal obtained by detecting the magnitude of hydraulic pressure transmitted from the master cylinder to the wheel cylinders in braking), the detecting signal from the acceleration sensor 103 employed to detect shaking of a vehicle body (a transverse acceleration value and a longitudinal acceleration value of the vehicle), and the detecting signal from the steering wheel torque sensor 102 employed to detect shaking of a steering wheel (a steering torque variation value of the steering wheel).

Next, the controller 100 determines whether judder was generated, on the basis of the determined amplitudes and frequencies of the signals.

To this end, the controller 100 determines whether the frequencies of the detecting signals determined in S202 coincide with a judder frequency, and simultaneously compares the magnitudes of the amplitudes of the detecting signals determined in S202 with a reference value (S203).

The judder frequency may be determined as an integer time of the rotation frequency of a tire.

As the result of comparing, when the frequencies of the detecting signals determined in S202 coincide with the judder frequency and the magnitudes of the amplitudes of the detecting signals determined in S202 are greater than the reference value, it is possible to determine that judder was generated.

In detail, when a frequency determined from the detecting signal from the hydraulic sensor 101 coincides with the judder frequency and the amplitude is greater than the reference value, it is possible to consider that shaking of a brake pedal was generated, and when a frequency determined from the detecting signal from the acceleration sensor 103 coincides with the judder frequency and the amplitude is greater than the reference value, it is possible to consider that shaking of a vehicle body due to judder was generated, and when a frequency determined from the detecting signal from the steering wheel torque sensor 102 coincides with the judder frequency and the amplitude is greater than the reference value, it is possible to consider that shaking of a steering wheel due to judder was generated.

In the instant case, it is checked whether vibration was generated due to an uneven road surface in braking (S204).

That is, when vibration is generated by an uneven road surface in braking, mis-sensing of judder may be caused, so whether vibration was generated due to an uneven road surface is checked through the logic that determines whether vibration is generated by an uneven road surface in S101 to S109.

Furthermore, when it is determined that vibration was generated due to an uneven road surface, judder is counted and the counting number is accumulated (S205).

Next, the controller 100 determines whether the accumulated number of times of counting judder exceeds a reference number of times (S206).

As the result of determining, when the accumulated number of times of counting judder exceeds a reference number of times, information saying that the accumulated number of times of counting judder exceeds a reference number of times is stored in the storage device 110 (S207).

Accordingly, a worker can easily know that a maintenance target vehicle is a vehicle in which judder was generated, by connecting a diagnosis device provided at the vehicle repair shop to the storage device 110 and checking the stored information when maintaining later. Therefore, excessive maintenance and mis-maintenance are prevented, being able to perform accurate maintenance.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for detecting brake judder in a vehicle, the system comprising:
    a hydraulic sensor configured for detecting hydraulic pressure which is distributed from a master cylinder to wheel cylinders of the vehicle;
    a steering wheel torque sensor configured for detecting steering torque of a steering wheel in the vehicle;
    an acceleration sensor configured for detecting transverse deceleration and longitudinal deceleration of the vehicle;
    a controller connected to the hydraulic sensor, the steering wheel torque sensor and the acceleration sensor and configured for determining when the brake judder is generated according to a detecting signal from the steering wheel torque sensor, a detecting signal from the acceleration sensor, and a detecting signal from the hydraulic sensor when the vehicle is braked, the brake judder being generated by thermal deformation and a thickness variation of a brake disc; and
    a storage device configured of storing information related to a result of determining when brake judder was generated by the controller.

2. The system of claim 1, wherein a brake pedal operation detecting switch is connected to the controller and is configured to transmit an on-signal or an off-signal thereof to the controller.

3. The system of claim 2, wherein whether the vehicle is braked is determined according to the on-signal of the brake pedal operation detecting switch.

4. The system of claim 1, wherein the controller is configured to determine when the brake judder was generated, by:
    determining amplitudes and frequencies of the detecting signal from the steering wheel torque sensor and the detecting signal from the acceleration sensor, and the detecting signal from the hydraulic sensor;
    determining when the determined frequencies of the detecting signals coincide with a judder frequency and comparing the determined amplitudes of the detecting signals with a reference value; and
    concluding that the brake judder was generated, when the determined frequencies of the detecting signals coincide with the judder frequency and the determined amplitudes of the detecting signals are greater than the reference value.

5. The system of claim 1, wherein a wheel speed sensor that measures of a wheel speed of each wheel in the vehicle is further connected to the controller and is configured to transmit a signal as a sensor for recognizing vibration due to a road surface.

6. The system of claim 1, wherein a diagnosis device that is configured to check when the brake judder was generated by checking stored information is connected to the storage device.

7. A method of detecting brake judder in a vehicle, the method comprising:
    checking, by a controller, whether the vehicle is braked and an anti-lock braking system (ABS) operates;
    determining, by the controller, whether the brake judder was generated, according to a detecting signal from a steering wheel torque sensor, a detecting signal from an acceleration sensor, and a detecting signal from a hydraulic sensor that detects hydraulic pressure of a master cylinder when the vehicle is braked and the ABS does not operate, wherein the steering wheel torque sensor, the acceleration sensor and the hydraulic sensor are electrically connected to the controller, the brake judder being generated by thermal deformation and a thickness variation of a brake disc; and
    storing, by the controller, information related to a result of determining whether the brake judder was generated, in a storage device.

8. The method of claim 7, wherein whether the vehicle is braked is determined according to an on-signal of a brake pedal operation detecting switch.

9. The method of claim 8, wherein in the determining that the brake judder was generated, when the controller concludes that vibration is not vibration due to an uneven road surface, a count of the brake judder is accumulated by the controller, and when an accumulated number of times of the count of the brake judder is greater than a reference number of times, information saying that the accumulated number of times of the count of the brake judder is greater than the reference number of times is stored in the storage device by the controller.

10. The method of claim 7, wherein the determining of whether the brake judder was generated by the controller includes:
    determining amplitudes and frequencies of the detecting signal from the acceleration sensor and the detecting signal from the steering wheel torque sensor, including the detecting signal from the hydraulic sensor;
    determining whether the determined frequencies of the detecting signals coincide with a judder frequency and comparing the determined amplitudes of the detecting signals with a reference value; and
    concluding that the brake judder was generated, when the determined frequencies of the detecting signals coincide with the judder frequency and the determined amplitudes of the detecting signals are greater than the reference value.

11. The method of claim 10, wherein a maintenance target vehicle is determined as a vehicle in which the brake judder was generated, through a process of connecting a diagnosis device provided at a vehicle repair shop to the storage device and checking stored information.

12. The method of claim 11, wherein the recognizing of vibration due to an uneven road surface includes:
    determining a reference wheel speed and a reference wheel speed inclination;
    determining a current wheel speed inclination of each wheel when the vehicle is braked and the ABS does not operate;

comparing the current wheel speed inclination with an upper limit and a lower limit of a reference wheel speed inclination, and counting a number of times when the current wheel speed inclination is greater than the upper limit of the reference wheel speed inclination and a number of times when the current wheel speed inclination is less than the lower limit of the reference wheel speed inclination, and storing the number of times in the storage device;

comparing an accumulated counting number stored in the storage device with a regulation number of times, and determining a cycle of the current wheel speed inclination when the accumulated counting number is greater than the regulation number of times; and comparing the determined cycle of the current wheel speed inclination with a wheel rotation cycle at each vehicle speed, and concluding that the vibration was generated due to an uneven road in braking when the determined cycle is not included in a distribution range of the wheel rotation cycle at each vehicle speed.

13. The method of claim 7, further including recognizing, by the controller, vibration due to an uneven road surface when the vehicle is braked.

14. The method of claim 13, wherein the cycle of the current wheel speed inclination is determined using maximum values and minimum values of the current wheel speed inclination that exceeds the upper limit of the reference wheel speed inclination or is lower than the lower limit of the reference wheel speed inclination, and a cross-point similar to the reference wheel speed inclination.

15. The method of claim 7, wherein the controller includes:
- a processor; and
- a non-transitory storage medium on which a program for performing the method of claim 7 is recorded and executed by the processor.

16. A non-transitory computer readable medium on which a program for performing the method of claim 7 is recorded.

17. A system for detecting brake judder in a vehicle, the system comprising:
- a hydraulic sensor configured for detecting hydraulic pressure which is distributed from a master cylinder to wheel cylinders of the vehicle;
- a steering wheel torque sensor configured for detecting steering torque of a steering wheel in the vehicle;
- an acceleration sensor configured for detecting transverse deceleration and longitudinal deceleration of the vehicle;
- a controller connected to the hydraulic sensor, the steering wheel torque sensor and the acceleration sensor and configured for determining when the brake judder is generated according to a detecting signal from the steering wheel torque sensor, a detecting signal from the acceleration sensor, and a detecting signal from the hydraulic sensor when the vehicle is braked, the brake judder being generated by thermal deformation and a thickness variation of a brake disc;
- a storage device configured of storing information related to a result of determining when the brake judder was generated, by the controller; and
- a diagnosis device connected to the storage device and configured to check the information related to whether the brake judder was generated which is stored in the storage device.

18. A system for detecting brake judder in a vehicle, the system comprising:
- a hydraulic sensor configured for detecting hydraulic pressure which is distributed from a master cylinder to wheel cylinders of the vehicle;
- a steering wheel torque sensor configured for detecting steering torque of a steering wheel in the vehicle;
- an acceleration sensor configured for detecting transverse deceleration and longitudinal deceleration of the vehicle;
- a controller connected to the hydraulic sensor, the steering wheel torque sensor and the acceleration sensor and configured for determining when the brake judder is generated according to a detecting signal from the steering wheel torque sensor, a detecting signal from the acceleration sensor, and a detecting signal from the hydraulic sensor when the vehicle is braked;
- wherein the controller is further configured to determine when the brake judder was generated, by determining amplitudes and frequencies of the detecting signal from the steering wheel torque sensor and the detecting signal from the acceleration sensor, and the detecting signal from the hydraulic sensor, determining when the determined frequencies of the detecting signals coincide with a judder frequency and comparing the determined amplitudes of the detecting signals with a reference value, the brake judder being generated by thermal deformation and a thickness variation of a brake disc; and
- a storage device configured of storing information related to a result of determining when the brake judder was generated, by the controller.

\* \* \* \* \*